Sept. 4, 1951 　　　A. A. BARCO 　　　2,566,510
POWER SUPPLY SYSTEM

Filed July 29, 1949 　　　3 Sheets-Sheet 2

INVENTOR
Allen A. Barco
BY
ATTORNEY

Sept. 4, 1951  A. A. BARCO  2,566,510
POWER SUPPLY SYSTEM
Filed July 29, 1949  3 Sheets-Sheet 3
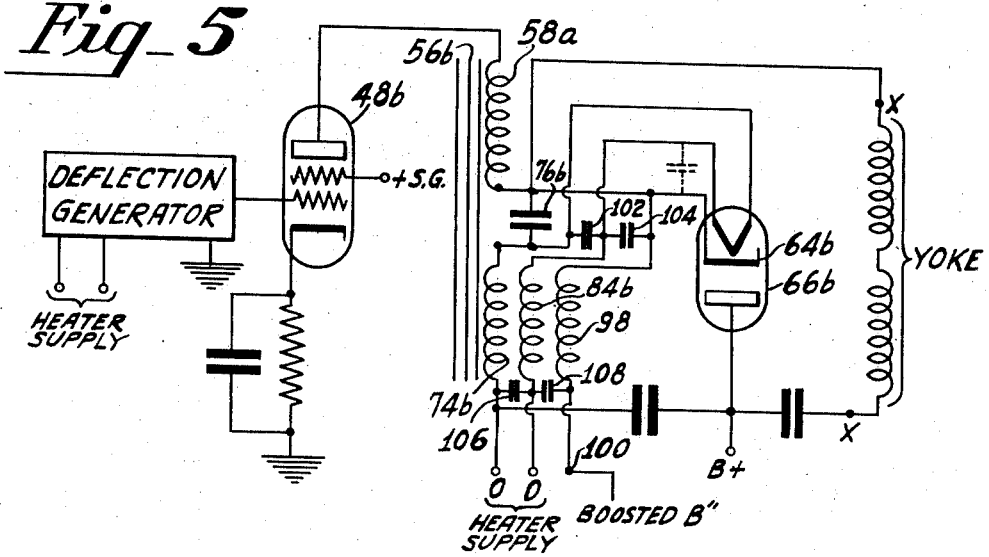
Fig_5
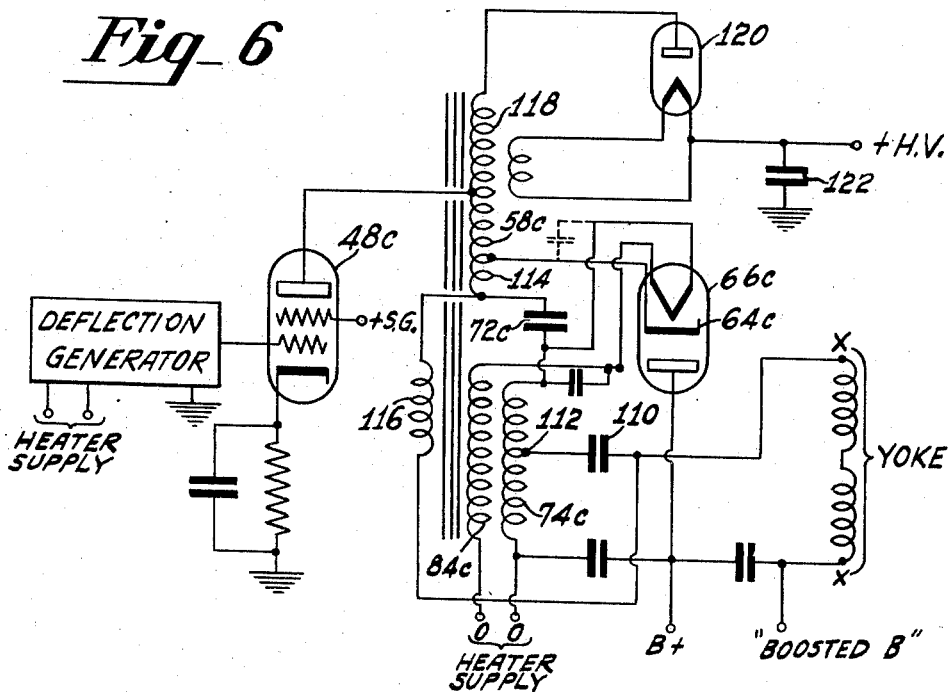
Fig_6
INVENTOR
Allen A. Barco
ATTORNEY Patented Sept. 4, 1951

2,566,510

UNITED STATES PATENT OFFICE 2,566,510

POWER SUPPLY SYSTEM

Allen A. Barco, Princeton, N. J., assignor to Radio Corporation of America, a corporation of Delaware Application July 29, 1949, Serial No. 107,575

23 Claims. (Cl. 315—27)

The present invention relates to power supply systems associated with electronic discharge tubes and the like, and more particularly, although not necessarily exclusively, this invention is concerned with simplification of such power supply systems thereby to permit greater latitude in the solution of design problems and to effect economy in design, production and equipment operation.

The present invention more directly concerns itself with a novel voltage cancelling arrangement applicable to electromagnetic transformers having associated electronic discharge devices whereby simplification and economy in the mode of power feed to the discharge device is achieved.

Moreover, the present invention is involved with a novel electromagnetic transformer arrangement permitting the simplified application of external lower frequency signal energies to points in the transformer system established at relatively high amplitude levels of higher frequency signals.

In more particularity, although not necessarily solely limited thereto, the present invention deals with improvements in electromagnetic cathode ray beam deflection systems for cathode ray equipment which aim to provide circuit arrangements requiring eminently less expensive circuit arrangements and devices in the supply of necessary operating energy.

In electrical equipment particularly of the electronic variety, there often arises the problem of supplying certain biasing potentials or operating energies to circuit terminals having present rather high amplitudes of alternating current voltages. For example, in electromagnetic deflection circuits for television receivers, it is commonly required to apply an electron discharge tube in damping relationship with respect to a portion of the magnetic circuit associated with the deflection yoke. This damper tube serves to reduce undesirable oscillatory or "ringing" transients, as they are sometimes spoken of, in the developed waveform while in some instances serving to recapture cyclically stored energy from the yoke for re-use by the remainder of the circuit thereby to enhance operating efficiency. In many applications of the damping device, the supply of heater energy thereto becomes somewhat of a problem inasmuch as the cathode of the damping device may sustain an alternating current pulse component of several thousand volts or so.

The use of iso-type winding output transformer, that is, an output transformer having isolated primary and secondary windings, in electromagnetic deflection circuits have in the past provided a convenient solution for overcoming the need of extreme care in supplying heater energy to such a damper tube. With an iso-type transformer winding, the secondary polarity of the transformer with respect to the primary is easily arranged so that the damper tube cathode is operated at substantially ground potential insofar as any deflection signal pulse component is concerned. The damper tube heater in such a circuit can be supplied with an auxiliary winding on the television receiver power transformer, or in the case where a damper tube employing an indirectly heated cathode is used, it is frequently possible to operate the damper tube heater from the same power transformer winding which supplies the remainder of the heaters in the receiver without exceeding the heater to cathode insulation breakdown voltage rating of the damper rectifier.

More recent developments in deflection circuits, as discussed in a co-pending U. S. patent application by Otto H. Schade, Serial No. 95,096 filed May 24, 1949 and issued January 2, 1951 as Patent No. 2,536,857, entitled "High Efficiency Cathode Ray Deflection Systems" as well as U. S. patent application by Edwin L. Clark et al., Serial No. 95,107, entitled "Power Recovery Cathode Ray Beam Deflection Systems," filed May 24, 1949, and issued January 2, 1951 as Patent No. 2,536,839, described certain advantages to be realized through the use of autotransformer types of output arrangements in electromagnetic deflection circuits. In the case of autotransformers, however, it is also generally required that the damper tube heater be supplied by a heater winding which is well insulated so as to withstand pulses of several thousand volts or more in amplitude. In receivers employing a power transformer, such a winding may, with some degree of economy, be included in the power transformer. However, some of the improved deflection circuits are capable of operating from lower "B" supply potentials than were formerly thought feasible so that in some instances it is permissible to dispense with the power transformer type of power supply and use a voltage doubler type "B" supply operating directly from the power line. In such cases a separate filament transformer insulated to withstand the pulse voltage has been required for the damper tube heaters. This tends to reduce somewhat, from an economy, and, therefore, a cost standpoint, the advantages of the autotransformer type output arrangement.

Similar power supply problems are common in other branches of electronics as will be realized by one skilled in the art. For example, the high amplitude pulses employed in radar, teleran, shoran, etc. often require circuitry employing separate transformers or power supplies purposely insulated at relatively high cost to withstand the high amplitude peaks of the pulse signal.

It is therefore a purpose of the present invention to provide a simple and novel arrangement for supplying operating energy to electrical circuit terminals displaying high amplitude alternating current signals without having to resort to costly insulation techniques.

It is a further object of the present invention to provide a novel and effective system for supplying heater energy to electron discharge tubes excited with high amplitude alternating current pulses from electromagnetic transformer windings.

It is still further a purpose of the present invention to provide a novel and improved circuit arrangement for electromagnetic cathode ray beam deflection systems in which heater power may be more simply and economically fed to a deflection damping tube having high voltage amplitudes of pulse components present on its cathode electrode.

Still another object of the present invention resides in the provision of a novel type autotransformer winding arrangement for electromagnetic deflection circuits employing an electron discharge tube damper such that the heater current for the discharge tube damper may be conveniently supplied through the windings of the deflection output autotransformer thereby eliminating the need for a more elaborate and insulated heater power supply arrangement.

Still another object of the present invention is to provide a novel voltage cancelling winding arrangement for auto type output transformers employed in electromagnetic deflection circuits whereby high efficiency reaction scanning "B" boost circuit action may be obtained with the "B" boost voltage so developed having absent therefrom the high amplitude pulse components normally produced by such deflection circuit action.

In the realization of the above objects, the present invention, in one of its broader aspects, employs a novel form of transformer winding, preferably, although not necessarily, of the bifilar or the trifilar variety. The point of power supply having present a pulse component is determined at a point along the transformer winding while at least one auxiliary winding of possibly the multifilar variety is proportioned to produce the same amplitude of pulse component as established at the point of power supply. The auxiliary winding is then galvanically separated, for example, by known means for suppressing direct current flow, from the main winding, with the two windings themselves being connected at their extremities to respective terminals of a power supply source and a power supply utilization means.

In the particular application of the present invention to auto type deflection output transformers for electromagnetic deflection circuits in which is employed a damper discharge tube in shunt with a portion of an output winding, the present invention contemplates the provision of a supplementary transformer winding having developed across its terminals a pulse voltage equal to that appearing at the damper discharge tube. Its auxiliary winding is preferably bifilarly wound with respect to the main winding on the autotransformer. The damper discharge tube heater terminals are then respectively connected to one extremity of the main and auxiliary windings while a source of heater power supply is connected to the other extremities of the main and auxiliary windings.

Other objects, advantages and features of the present invention, as well as those brought out above, will become apparent from the following detailed operational description of the present invention, the description itself being more readily understandable when taken in connection with the accompanying drawings in which:

Figure 5 is a still further form of deflection circuit including an embodiment of the present invention; and Figure 6 shows still another form of deflection circuit embodying the novel features of the present invention.

Figure 1:
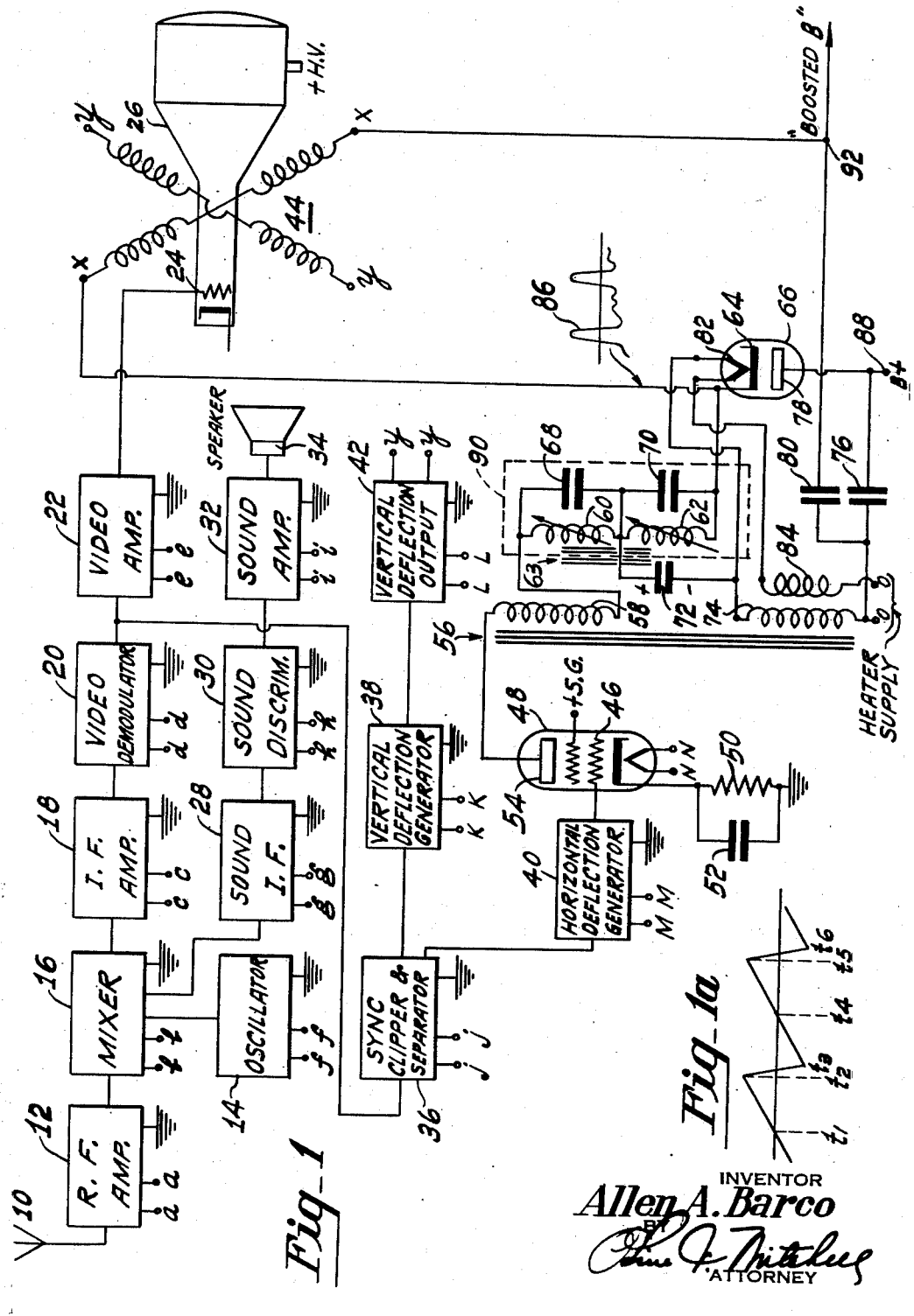
Figure 1 shows one embodiment of the present invention as applied to a conventional form of television receiver.

Turning now to Figure 1, there is shown diagrammatically and in block form, the individual components of a television receiver modified, however, in a way made possible by the present invention, as will be pointed out in detail hereinafter. The portions of the receiver shown in block form are more or less conventional and are included as an illustrative setting of the invention. Television signals are intercepted by the antenna 10, amplified by the R. F. amplifier 12, heterodyned by the oscillator 14 through the agency of mixer 16 to produce an I. F. (intermediate frequency) signal suitable for amplification by the I. F. amplifier 18. The output of the I. F. amplifier 18 is then applied to video demodulator 20 which supplies, at its output, the demodulated video signal which is in turn amplified by the video amplifier 22 for application to the control electrode 24 of the cathode ray kinescope 26. A conventional sound channel comprising the sound I. F. amplifier 28, sound discriminator 30 and sound amplifier 32 driving the sound reproducer 34, is suitably supplied with signals from the mixer 16. In order to obtain deflection circuit synchronizing information, the demodulated video signal appearing at the output of the demodulator 20 is applied to a sync clipper and separator circuit 36, which provides, at its output terminals, synchronizing signal information for the vertical and horizontal deflection generators indicated at blocks 38 and 40, respectively. The output of the vertical deflection generator 38 is conventionally applied to a vertical deflection output stage 42 having output terminals Y—Y in themselves indicated for connection to the respective terminals Y—Y of the vertical deflection winding of the deflection yoke 44.

In further accord with conventional practice, the output of the horizontal deflection generator 40 is applied to the control electrode 46 of the horizontal output electron discharge tube 48, This tube is shown as having a resistance 50, shunted by capacitance 52, connected in the cathode circuit thereof. The anode 54 of the horizontal output tube 48 is then connected for driving an autotransformer 56 which is in turn connected in a type of deflection circuit which, with the exception of the unique features of the present invention, is substantially the same as shown and described in the above-mentioned U. S. patent application by Otto H. Schade, Serial No. 95,096.

As shown in the drawing, and more in detail, the anode 54 is connected with the uppermost portion of the first winding section 58 of the autotransformer 56. The lower end of the first winding section 58 is connected, through the variable inductance windings 60 and 62 of a linearity control autotransformer 63 to the cathode 64 of the damper tube 66. Each section 60 and 62 of the linearity control autotransformer 63 has respectively placed across it a linearity control capacitor such as 68 and 70. Capacitors 68 and 70 are not especially related to the disclosure and description of the present invention. A discussion of elements similarly used is to be found in the RCA Review for September 1947 in an article entitled "Magnetic deflection circuits for cathode ray tubes" by Otto H. Schade. The junction of the windings 60 and 62 of the linearity transformer is capacitively coupled by means of capacitor 72 to the upper terminal of the output autotransformer second winding section 74. In order to complete, from an alternating current standpoint, the damping circuit for the diode 66, another coupling capacitor 76 is connected between the lower terminal of the output transformer second winding section 74 and the anode 78 of the damping diode 66. The horizontal deflection winding X—X of the deflection yoke 44 is then connected for excitation between the cathode 64 of the damper 66 and to the lower terminal of the autotransformer second winding section 74 through D. C. blocking capacitor 80.

According to the present invention, an auxiliary winding 84 is wound on the same magnetic structure as the first and second winding sections of the autotransformer 56 and is so proportioned that the voltage developed across its terminals, as shown, is substantially equal to the voltage developed across the autotransformer second winding section 74. In practice, the auxiliary winding 84 may be bifilarly wound with respect to the autotransformer windings 58 and 74 and is preferably bifilarly wound with respect to the second winding section 74 thereof. As will be understood by those skilled in the art, a multifilar winding is one consisting of a number of separate filamentary conductors insulated from each other and wound simultaneously and together as a single composite cord to form a coil member. For example, a bifilar transformer winding would consist of two separate insulated conductors wound adjacent one another at the same time to form a particular transformer winding. A trifilar winding would of course embrace three separate conductors forming the particular single transformer winding per se. As hereinafter more fully described, heated power may then be applied to terminals O—O at one extremity of the windings 74 and 84 and the respective terminals of the damper tube heater 82 applied to the other extremities of the windings 74 and 84. The described connection for heater power is made possible by this invention. As a direct result, the apparatus is less costly as pointed out above.

This particular form of electromagnetic cathode ray deflection system with which the present invention has been exemplarily embodied can be seen to be of the reaction scanning "B" boost power recovery type. Since the detailed operational discussion of the deflection circuit as a whole in no way affects the novel features of the present invention, detailed operating description is not thought necessary at this time. The above referenced patent application to Otto H. Schade does, however, deal with considerable detail with the consideration of overall deflection generating methods as applicable to this form of circuit. However, for the present purposes, it will be assumed, as in conventional reaction scanning type arrangements, that the output discharge tube 48, receiving excitation in substantially sawtooth manner from the horizontal deflection generator 40, is biased so that plate current conduction is established only during the latter portion of each sawtooth. Figure 1a illustrates the deflection current waveform to be found in such a form of reaction scanning system. From interval $t1$—$t2$, the output discharge tube 48 continues to establish a linear rise of current through the autotransformer windings 58 and 74, as well as through the horizontal winding X—X of the deflection yoke 44. At the end of the linear rise time $t2$, the sawtooth applied to the discharge tube 48 swings highly negative and discontinues plate current flow through the autotransformer 56. It is during the ensuing time $t2$—$t3$ that the flux previously stored in the deflection yoke winding X—X collapses and produces a very high amplitude peak or pulse across the yoke as illustrated by the waveform 86 appearing at the cathode 64 of the discharge tube 66. As is well known to those skilled in the art, this pulse component may be well in the order of several thousand volts or more and represents, in duration, approximately one-half cycle of the free resonance of the magnetic circuit taken as a whole.

The collapsing of the flux is accompanied by one-half cycle of free oscillation at the end of which the damper tube 66 becomes conductive and the magnetic energy then stored in the yoke windings X—X produces a current flow through the damper discharge tube. The damper tube current thus flowing through the capacitor 76, winding 74, capacitor 72, and linearity inductance 62, is in such a direction as to charge the various circuit capacities with the polarity indicated so that the cathode 64 of the damper tube 66, as in virtually all types of "B" boost power recovery systems, is established at a higher D. C. potential relative to ground than the positive B+ power supply terminal 88. During the period $t3$—$t4$ in Figure 1a, the current flow through the yoke is substantially linear to provide the desired linear deflection of the cathode ray beam.

It will be apparent that the linearity control arrangement comprising the linearity control autotransformer 63 and associated circuitry embraced by the dotted line area 90 may or may not be incorporated depending upon the requirements for control of the deflection signal. Furthermore, the type of linearity control circuit employed may vary considerably without affecting the fundamental principles in either the operation of the deflection circuit as a whole or the operation of the present invention about to be described.

In the form shown, however, variation of the autotransformer inductances 60 and 62 acts to change the phase of the voltage appearing across these inductances and hence the alternating bias voltage imposed in series with the damper 66. Since this alternating bias tends to control the conduction characteristics of the damper 66, it is possible, as described more fully by Otto H. Schade in the article in the Sept. 1947 issue of the RCA Review, to control with a high degree of versatility the waveform actually developed through the deflection winding X—X.

As just seen, there is developed at the cathode 64, a very high amplitude of alternating voltage which, if the filaments 82 were supplied from a conventional ground referenced filament supply commonly used in television receivers, might well exceed the maximum permissible heater-cathode voltage rating of the discharge tube and thereby produce failure thereof. According to the present invention, however, a conventional source of ground referenced filament energy may be employed through the use of the auxiliary winding 84 connected with one terminal of the heater 82. Since the voltage developed across the auxiliary winding 84 is made, in accordance with the present invention, equal to the voltage developed across the autotransformer second winding section 74 to which the other terminal of the heater 82 is connected, both terminals of the heater 82 will rise and fall in accordance with the pulse component which, as shown, appears at the cathode 64. Thus, the magnitude of the voltage between the heater 82 and cathode 64 need not exceed the maximum permissible heater-cathode potential of the damper 66. Since the coupling capacitor 72, connecting the autotransformer second winding section 74 with the autotransformer first winding section 58 (through the winding 60 of the linearity control, if employed) is only sufficiently large to present a low reactance to the deflection frequencies involved it may well be small enough to provide a high reactance to the power line frequency used to excite the heater 82. Thus, from a relatively low frequency, or D. C., standpoint if desired the heater circuit from the heater supply terminals O—O to the heater 82 is entirely isolated from the remainder of the deflection circuit while from a high frequency A. C. standpoint, the terminals O—O have substantially no voltage variation with respect to ground due to the cancelling effects of the voltages appearing across windings 74 and 84.

Figure 2:
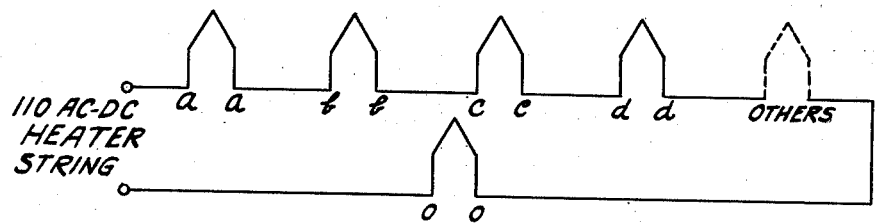
Figure 2 illustrates a heater power supply arrangement made possible by the present invention.

In accordance with the present invention, this then permits the power demands of the heater 82 in the damper discharge tube 66 to be supplied from any convenient form of conventional heater power supply source, for example, illustrated in Figure 2. Here a plurality of the heater supply terminals such as aa, bb, cc, dd, etc. for the individual circuit stages of the television receiver may be connected in series with the terminals O—O of the horizontal deflection circuit across the ordinary power line terminals coming into the set. This, of course, is particularly advantageous in the case of A. C.-D. C. television receivers wherein no power transformer per se is utilized. Any additional filaments or heaters are represented by the dotted line filament which is diagrammatically shown.

Figure 3:
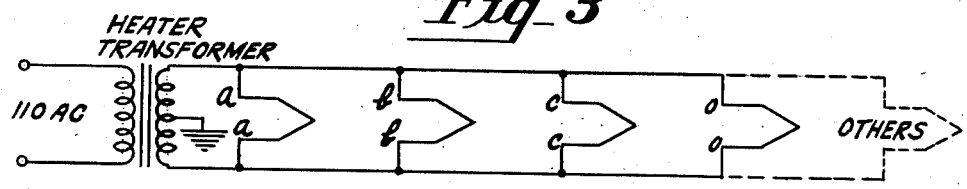
Figure 3 is another form of heater power supply permitted by the present invention.

Again in accordance with the present invention, should it be desired to employ the arrangement of Figure 1 in connection with a heater supply transformer, as found in conventional A. C. receivers, the arrangement of Figure 3 may be successfully employed wherein the heater supply terminals O—O of the damper tube 66 are merely connected in parallel with any other heater power supply terminal of the television receiver such as aa, bb, cc, etc., with of course proper attention being given to heater voltage requirements.

It is therefore evident that the present invention lends considerable versatility to heater supply arrangements in television receivers and obviates the necessity of providing an expensive and bulky insulated winding designated for supplying the heater demands of the damper discharge tube 66.

As brought out above, there appears at the cathode 64 of the damper discharge tube 66, a unidirectional potential level in excess of that available at the B+ power supply terminal 88 in Figure 1. Besides producing a boost in the voltage applied to the anode of the output discharge tube 48, it is often desired to utilize the boosted "B" voltage to operate other circuits in the television receiver which inherently exhibits improved characteristics under the influence of a higher "B" supply potential. For example, in many television circuits, the boosted "B" voltage, regardless of the manner in which it is produced, is used as a "B" power supply source for the horizontal and vertical deflection generator circuits to improve the linearity of the developed deflection signal used for driving the deflection signal output stages. It is obvious in the arrangement of Figure 1 that the direct application of the composite voltage appearing at the cathode 64 of the damper tube 66 to the "B" supply terminal of an auxiliary stage would be unsatisfactory unless considerable filtering were employed to reduce the pulse component 86. A filter network adequate to achieve the necessary filtering would, of course, represent an undesirable expense to the overall cost of the television receiver. Therefore, as shown in Figure 1, the boosted "B" voltage may be extracted from terminal 92 which is galvanically connected with the cathode 64 of the damper diode 66 through the horizontal winding itself and is thereby freed from the pulse component appearing at the upper end of the winding. The boosted "B" voltage appearing at the terminal 92 will need very little filtering before it is suitable for use by practically any stage in the television receiver needing the same. In general, such stages have low load requirements and will not disturb the cathode ray beam.

Figure 4:
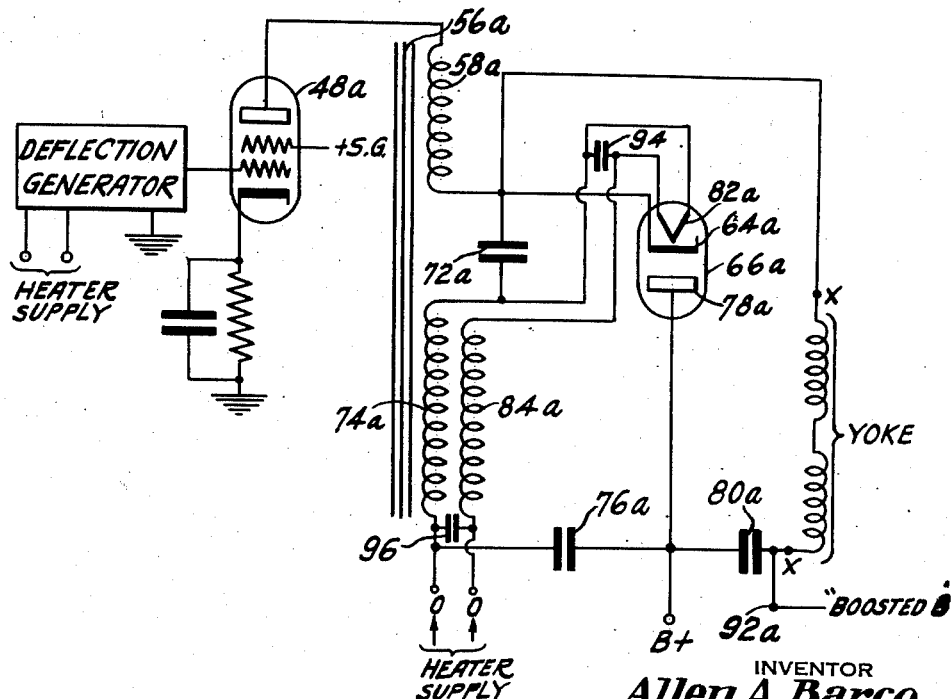
Figure 4 illustrates another form of deflection circuit similar to that shown in Figure 1 in which the present invention is embodied and finds useful application.

Another embodiment of the present invention very similar to the arrangement of Figure 1 is illustrated in Figure 4. Here the linearity control network illustrated in Figure 1 and falling within the dotted line area 90 has been eliminated to simplify the showing. Again, the transformer second winding section 74a with the auxiliary 84a are employed to convey the heater power from the terminals O—O to the heater 82a of the damper tube 66a. This circuitry is the same in operation as that described with respect to windings 74, 84 and heater 82 in Figure 1. In Figure 4, however, an alternative connection of the deflection yoke winding X—X is shown. Although the upper end of the deflection yoke X—X is connected with the cathode 64a of the damper tube 66a, the lower end of the yoke winding is coupled through capacitor 80a to the anode 78a of the damper 66a. In Figure 1, it will be noted that the equivalent of the capacitor 80a was directly connected with the lowermost terminal of the autotransformer second winding section 74a. This difference in circuitry is rather arbitrary but may be preferred over the arrangement in Figue 1 in some instances.

In Figure 4, equalizing capacitances 94 and 96 connected between the extremities of the windings 74a and 84a are also illustrated to show a preferred method for compensating for any discrepancies in stray capacitances or turns between the windings 74a and 84a. The capacitors 94 and 96 are made sufficiently large to be of very low impedance at the deflection frequency and its harmonics but of relatively high impedance to the frequency of the heater power supplies (which again in the limit may be purely direct current supply voltage). The equalizing effects of capacitors 94 and 96 therefore tends to ensure that the voltage appearing across the winding 84a is exactly the same as the voltage appearing across the winding 74a thus to provide perfect cancellation of the pulse appearing thereacross. The boosted "B" voltage appearing at terminal 92a is again in accordance with the showing and description with reference to Figure 1.

Should it be desired not to have any auxiliary boosted "B" load current pass through the deflection yoke as would be the case when the auxiliary load on the boosted "B" potential was relatively high, the arrangement in Figure 5 becomes convenient. Here, in accordance with the present invention, still another auxiliary winding 98 is added to the autotransformer and may be trifilarly wound with respect to the other windings 74b and 84b. If the turns of the auxiliary winding 98 are the same as the windings 74b and 84b, the pulse component induced thereacross will be substantially equal to the pulse appearing at the cathode 64b of the damper tube 66b. Thus, if the winding 98 is connected in proper phase relation to the cathode 64b, there will appear at the boosted "B" terminal 100 only the D. C. boosted "B" potential appearing at the cathode 64b. In this case, the pulse induced across the winding 98 will cancel the pulse appearing at the cathode. Boosted "B" currents will then no longer flow throuhg the yoke winding X—X and will be confined to the auxiliary winding 98. Equalizing capacitors 102, 104, 106, and 108 may be placed in shunt across the trifilar windings for the purposes described in connection with the equalizing capacitors 94 and 96 in Figure 4.

In some forms of deflection circuits, especially of the autotransformer variety, it may be desirable that the winding inductance of the deflection yoke be held under a predetermined maximum. In such an event, a higher primary to secondary turns ratio will be necessary for proper loading of the output tube. Such an arrangement for accomplishing this change in loading without affecting the impedance transformation ratio from the damping diode to the output tube is shown in Figure 6. Here the upper terminal of the deflection yoke X—X, instead of being connected to the cathode of the damper tube 66c as in the case of Figure 5, is capacitively connected through coupling capacitor 110 to a tap 112 on the autotransformer second winding section 74c. This effects greater magnification of the yoke impedance as viewed in the load circuit of the output discharge tube 68c. The damping diode 66c is still substantially in shunt only with the second autotransformer winding section 74c. It will be noticed, however, that the cathode 64c instead of being directly connected with the upper terminal of the coupling capacitor 72c, as in the previous embodiments, may be separated therefrom by a few turns 114 of the autotransformer first winding section 58c. This may be desirable, depending upon the individual application of the circuit arrangement. However, with the apparatus arranged in accordance with Figure 6 to include turns 114, it will be noted that a net heater-cathode pulse voltage will obtain, which of course must be held under the maximum permissible heater-cathode voltage for the diode 66c. Furthermore, since the actual "B" boost potential appears at the upper terminal of capacitor 72c, it is only necessary in accordance with this form of the present invention to provide an auxiliary winding 116 between this point and the upper terminal of the deflection yoke winding X—X. In this particular arrangement, the turns of the winding 116 are so governed as to produce an alternating voltage equal to that appearing between the upper terminal of the capacitor 72c and the tap 112 on the autotransformer second winding section 74c. Hence, the upper terminal of the capacitor 72c will be effectively galvanically coupled with the upper end of the deflection yoke X—X with the alternating voltage induced in the winding 116 preventing any alternating current flow between these two points. "B" boost power may then be removed from the lower terminals of the deflection yoke X—X. If, of course, it is not desired to pass the auxiliary "B" boost current through the deflection yoke winding X—X, an arrangement similar to Figure 5 may be utilized. Auxiliary winding 116 of Figure 6 may be either separately or trifilarly wound with respect to the windings 74c and 84c.

By way of example, in Figure 6 there is shown an extension winding 118 which is above the upper terminal of the autotransformer first winding section 58c. This feature serves to provide a source of stepped-up positive-going flyback pulses for rectification by the diode 120 and storage by the capacitor 122. The high unidirectional potential so produced may then be used for any desirable purpose such as, for example, the supply of high voltage accelerating potential of the kinescope 26. In Figure 1, it is manifest that the additional winding 118 could be incorporated in any of the arrangements shown in Figures 1, 4, and 5; while as noted above any linearity control such as that shown, for example, in the dotted line area 90 of the Figure 1 could be incorporated in the arrangements of Figures 4, 5, and 6.

From the foregoing it is seen that the applicant has provided a simple, novel and effective arrangement for compensating for alternating current potential differences in transformer systems in such a way as to permit an improved manner of power supply to electrical circuits connected with the transformer itself.

Having thus described my invention, what I claim is:

1. In an electrical circuit the combination of a signal transformer having a first and second galvanically separable winding with a third winding bifilarly wound with said second winding, utilization means having a set of relatively low frequency input terminals and a set of relatively high frequency input terminals, connections between said utilization means high frequency input terminals and said first and second transformer windings for excitation thereof, means for substantially galvanically isolating said second and third windings from said utilization means and from said first winding, a connection from said utilization means low frequency input terminals to respective points on said second and third transformer windings, a source of low frequency energy and connections from said source of low frequency energy to two other respective points on said transformer second and third windings for supplying through said second and third windings low frequency energy to said utilization means low frequency input terminals.

2. Apparatus according to claim 1 wherein said means for substantially galvanically separating said second transformer winding from said first transformer winding comprises a circuit path having a substantially high galvanic resistance with a substantially low impedance to signal frequencies of a value suitable for application to said utilization means high frequency input terminals.

3. In an electrical system, a signal transformer having first and second galvanically separable windings, coupling means having a high galvanic impedance and a low alternating current impedance connected between said first and second windings, an alternating current utilization means connected with said first and second windings for excitation therefrom, means for establishing said first transformer winding at a given direct current potential with respect to a potential datum, means for establishing a substantially galvanically isolated terminal of said utilization means at a different unidirectional potential relative to said voltage datum, the alternating current potential of said first winding being different from the alternating current potential of said utilization means terminal in operation of the system, a bridging winding electromagnetically coupled to said transformer and so proportioned as to develop across its terminals a voltage equal to the alternating current potential between said first transformer winding and said utilization means terminal, and connections placing said bridging winding between said first transformer winding and said utilization means terminal to provide a galvanic connection therebetween whereby direct current flow is permitted and alternating current flow is opposed.

4. In an electrical system, the combination of, a signal transformer having an output winding, means for exciting said transformer to develop a relatively high frequency output voltage across said output winding, utilization means having a set of relatively high frequency input terminals and a set of relatively low frequency input terminals, connections placing said utilization means high frequency input terminals in shunt with at least a portion of said output winding, low frequency energy supply terminals, a connection from one low frequency energy supply terminal to a first point on said output winding, a connection from one utilization means low frequency input terminal to a second point on said output winding, an auxiliary winding on said transformer proportioned to develop the same high frequency output voltage as developed between said output winding first and second points for a given excitation of said transformer, a connection from the other utilization means input low frequency input terminal to one extremity of said auxiliary winding, and a connection from the other low frequency power supply terminal to the other extremity of said auxiliary winding.

5. Apparatus according to claim 4 wherein said output winding and said auxiliary winding are at least in part bifilarly wound relative to one another.

6. Apparatus according to claim 4 wherein said utilization means incorporates an electron discharge tube having at least a heater, anode and cathode, and wherein said utilization means high frequency input terminals are connected within said utilization means to supply energy to said discharge tube anode-cathode circuit while said utilization means low frequency input terminals are connected within said utilization means for supplying energy to said discharge tube heater.

7. Apparatus according to claim 4 wherein there is additionally provided means for establishing a point in said utilization means at a relatively high unidirectional potential relative to a potential datum, said point having present thereat a substantial amplitude of high frequency exciting voltage, a second auxiliary winding on said transformer so proportioned to develop across its extremities a voltage substantially equal to the high frequency potential appearing at said point in said utilization means, a connection from one extremity of said second auxiliary winding to said point in said utilization means, and a connection from the other extremity of the second auxiliary winding and another utilization means of a type designated for operation from the unidirectional potential appearing at said point in said first-mentioned utilization means, said other utilization means being connected with said potential datum.

8. Apparatus according to claim 7 wherein said second auxiliary winding is at least in part trifilarly wound with respect to said output winding and said first auxiliary winding.

9. In an electrical circuit, the combination of, an autotransformer having a first and second winding section galvanically separable from one another, a capacitor connected between one extremity of said first winding section and one extremity of said second winding section to form a low-impedance path between said winding sections for relatively high frequency currents, an electron discharge tube having at least an anode, a cathode and a heater, said heater having a first and second input terminals, a connection from one of said discharge tube elements other than said heater to a point on said autotransformer first winding section and a connection from the other discharge tube element other than said heater to a point on said autotransformer second winding section, a capacitor connected in series with said last-named connection, heater power supply terminals, a connection from a first tap on said autotransformer second winding section to one heater power supply terminal, a connection from a second tap on said transformer second winding section to the first heater input terminal of said discharge tube, an auxiliary winding on said transformer proportioned to develop a voltage at least equal to the potential between said second winding sections first and second taps for a given excitation of said autotransformer, and a connection from one point on said auxiliary winding to said discharge tube second heater input terminal, and a connection from another point on said auxiliary winding to the heater power supply terminal.

10. Apparatus according to claim 9 wherein said autotransformer second winding section and said auxiliary winding are at least in part bifilarly wound together.

11. Apparatus according to claim 9 wherein there is additionally provided alternating current utilization means connected in shunt with at least a portion of said autotransformer second winding section, means for establishing said autotransformer first winding section at a unidirectional potential level in excess of that appearing at the element of said discharge tube connected with said second winding section, direct-current utilization means having input terminals designated for response to the unidirectional potential established between said autotransformer second winding section and said discharge tube element connected with said autotransformer first winding section, a second auxiliary winding on said autotransformer adapted to develop an alternating current potential substantially equal to the alternating current potential appearing between the discharge tube extremity of said first winding section and the point on said autotransformer second winding section to which said alternating current utilization means is connected, and connections placing said second auxiliary winding between the discharge tube extremity of said autotransformer first winding section and one input terminal of said direct current utilization means.

12. Apparatus according to claim 11 wherein said second auxiliary winding is trifilarly wound at least in part with respect to said autotransformer second winding, and said other auxiliary winding.

13. In an electromagnetic deflection circuit employing an electromagnetic deflection yoke having a deflection winding thereon designated for excitation by coupling with the anode-cathode circuit of an electron discharge output tube, in combination, an autotransformer having at least a first and second galvanically separable winding sections, a capacitor connecting one extremity of said autotransformer first winding section with one extremity of said autotransformer second winding section, means for capacitively connecting the deflection yoke winding in shunt with at least a portion of said autotransformer second winding section, a damper discharge tube having at least an anode and a cathode, a connection from said cathode to a point on said autotransformer first winding section, a connection from the anode of said output discharge tube to another point on said autotransformer first winding section, capacitive coupling from said damper discharge tube anode to a point on said autotransformer second winding section, a connection from said damper discharge tube anode to a terminal of a source of polarizing potential for said output discharge tube anode-cathode circuit such that there is developed at said autotransformer first winding section a positive D. C. potential in excess of that appearing at said polarizing potential terminal, an auxiliary winding on said autotransformer so proportioned as to develop a potential at least equal to the alternating current potential normally appearing between a predetermined point on said autotransformer first winding section and one terminal of said deflection yoke, a connection between a point on said auxiliary winding and said predetermined point on said autotransformer first winding section, and a connection from another tap on said auxiliary winding to a unidirectional utilization means adapted for operation from the increased potential appearing at said autotransformer first winding section 14. Apparatus according to claim 13 wherein said auxiliary winding is bifilarly wound with respect to at least a portion of the winding on said autotransformer.

15. Apparatus according to claim 14 wherein one terminal of said deflection yoke winding is galvanically connected with the damper tube cathode extremity of said autotransformer first winding section, while the other terminal of said deflection yoke winding is capacitively connected with said damper discharge tube anode extremity of said autotransformer second winding section.

16. Apparatus according to claim 13 wherein a capacitor is connected between one terminal of said deflection yoke winding and a tap on said autotransformer second winding section while another capacitor is connected between the other terminal of said deflection yoke winding and the damper discharge tube anode, and wherein the utilization means extremity of said auxiliary winding is galvanically connected with the second winding tap extremity of said deflection yoke winding, and the damper tube anode extremity of said deflection yoke winding is galvanically coupled with said unidirectional potential utilization means.

17. Apparatus according to claim 13 wherein said damper discharge tube is supplied with a heater element having a first and second power input terminal, a galvanic connection from a first point on said autotransformer second winding section to one heater power input terminal, a pair of heater power supply terminals, a connection from a second point on said autotransformer second winding section to one heater power supply terminal, and wherein there is further provided a second auxiliary winding on said autotransformer so proportioned as to develop a voltage at least equal to the alternating current potential existing between said last-named first and second points on said autotransformer second winding section, a connection from one point on said second auxiliary winding to the second power input terminal of said discharge tube heater, and a connection between another point on said second auxiliary winding and the other heater power supply terminal.

18. Apparatus according to claim 17 wherein said second auxiliary winding is trifilarly wound with respect to said autotransformer second winding section and said other auxiliary winding.

19. Apparatus according to claim 18 wherein there are additionally provided a plurality of capacitors having substantially low reactance to the operating frequency of said transformer but relatively high impedance to the voltage waveform applied to said discharge tube heater, connections placing said capacitors between points of substantially equal alternating current voltage along and between said autotransformer second winding section, the first auxiliary winding and the second auxiliary winding.

20. In an electromagnetic deflection circuit employing an electromagnetic deflection yoke having a winding thereon designated for excitation from the anode-cathode circuit electron discharge output tube, the combination of an autotransformer having a first and second galvanically separable winding sections, a capacitor connected between one extremity of said first winding and one extremity of said second winding section, connections capacitively coupling said deflection yoke winding in shunt with a portion of said autotransformer winding, a damper tube having at least a heater, cathode and anode, said heater having a first and second input terminals, a connection from a point on said autotransformer first winding section to the output discharge tube anode, a connection from said damper discharge tube anode to a source of anode-cathode polarizing potential for said output discharge tube, a capacitor connected between said damper tube anode and the free extremity of said autotransformer second winding section, a connection from said damper tube cathode to a point on said first winding section, a connection from the first-named capacitor extremity of said second winding section to one heater input terminal of said damper tube, a first and second heater power supply terminals, a connection from one of said heater power supply terminals to the damper tube anode extremity of said autotransformer second winding section, an auxiliary winding on said autotransformer so proportioned to develop a voltage substantially equal to the voltage developed by said second winding section under normal operating conditions, and connections placing said auxiliary winding between the second heater input terminal of said damper tube and the other heater power supply terminal.

21. Apparatus according to claim 20 wherein there is additionally provided a second autotransformer having a variable inductance primary and a variable inductance secondary and connections placing said autotransformer primary in series with the connection of said damper tube cathode and said capacitor connected between said first autotransformer first and second winding sections and wherein said second autotransformer secondary winding is connected between said first autotransformer first winding section and said last-named capacitor.

22. In a television receiver having a plurality of signal circuits each employing an electron discharge tube having a heater element, in combination a source of heater energy for said discharge tube heaters, said source having a first and second heater power supply terminals, an electromagnetic deflection circuit for said television receiver in turn comprising a deflection output discharge tube having an anode and a cathode, an electromagnetic deflection yoke having winding terminals designated for excitation from said output discharge tube, an autotransformer having a first and second galvanically separable winding sections, a capacitor connected between one extremity of said first winding section and one extremity of said second winding section, connections capacitively coupling said deflection yoke winding in shunt with a portion of said autotransformer winding, a damper tube having at least a heater, cathode and anode, said heater having a first and second input terminals, a connection from a point on said autotransformer first winding section to the output discharge tube anode, a connection from said damper discharge tube anode to a source of anode-cathode polarizing potential and said output discharge tube, a capacitor connected between said damper tube anode and a free extremity of said autotransformer second winding section, a connection from said damper tube cathode to a point on said first winding section, a connection from the first-named capacitor extremity of said second winding section to one heater input terminal of said damper tube, a connection from one of said heater power supply terminals to the damper tube anode extremity of said autotransformer second winding section, an auxiliary winding on said autotransformer so proportioned as to develop a voltage substantially equal to the voltage developed by said second winding section under normal operating conditions, connections placing said auxiliary winding between the second heater input terminal of said damper tube and the other heater power supply terminal, and the connections of the heater power supply terminal extremities of said autotransformer second winding section and auxiliary winding being in series with predetermined groups of serially connected heaters among said television receiver signal circuits.

23. In a television receiver having a plurality of signal circuits each employing an electron discharge tube having a heater element, in combination, a source of heater energy for said discharge tube heaters, said source having a first and second heater power supply terminals, an electromagnetic deflection circuit for said television receiver in turn comprising a deflection output discharge tube having an anode and a cathode, an electromagnetic deflection yoke having winding terminals designated for excitation from said output discharge tube, an autotransformer having a first and second galvanically separable winding section, a capacitor connected between one extremity of said first winding and one extremity of said second winding section, connections capacitively coupling said deflection yoke winding in shunt with a portion of said autotransformer winding, a damper tube having at least a heater, cathode and anode, said heater having a first and second input terminals, a connection from a point on said autotransformer first winding section to the output discharge tube anode, a connection from said damper discharge tube anode to a source of anode-cathode polarizing potential and said output discharge tube, a capacitor connected between said damper tube anode and a free extremity of said autotransformer second winding section, a connection from the first-named capacitor extremity of said second winding section to one heater input terminal of said damper tube, a connection from one of said heater power supply terminals to the damper tube anode extremity of said autotransformer second winding section, an auxiliary winding on said autotransformer so proportioned to develop a voltage substantially equal to the voltage developed by said second winding section under normal operating conditions, connections placing said auxiliary winding between the second heater input terminal of said damper tube and the other heater power supply terminal, and the connections of the heater power supply terminal extremities of said autotransformer second winding section and auxiliary winding being in parallel connection with predetermined groups of parallel connected heaters among said television receiver signal circuits.

ALLEN A. BARCO.

REFERENCES CITED

The following references are of record in the file of this patent:

UNITED STATES PATENTS

| Number | Name | Date |
|---|---|---|
| 2,212,217 | White et al. | Aug. 20, 1940 |
| 2,218,764 | Moller et al. | Oct. 22, 1940 |
| 2,223,990 | Holmes | Dec. 3, 1940 |
| 2,265,620 | Bahring | Dec. 9, 1941 |
| 2,360,697 | Lyman | Oct. 17, 1944 |
| 2,397,150 | Lyman | Mar. 26, 1946 |
| 2,470,197 | Torsch | May 17, 1949 |
| 2,482,737 | Shaw | Sept. 20, 1949 |
| 2,490,743 | Sziklai | Dec. 6, 1949 |